United States Patent [19]
Uesugi

[11] Patent Number: 5,589,089
[45] Date of Patent: Dec. 31, 1996

[54] YAG LASER MACHINE WITH SAFETY SYSTEM FOR BEAM PATH ADJUSTMENT

[75] Inventor: Akira Uesugi, Noda, Japan

[73] Assignee: Miyachi Technos Corporation, Chiba, Japan

[21] Appl. No.: 323,521

[22] Filed: Oct. 14, 1994

[30]  Foreign Application Priority Data

Oct. 19, 1993  [JP]  Japan ...................................... 5-261100

[51] Int. Cl.$^6$ ...................................................... B23K 26/00
[52] U.S. Cl. ........................................................ 219/121.6
[58] Field of Search ........................... 219/121.6, 121.61, 219/121.62, 121.73, 121.76, 121.83, 121.85, 121.78; 372/108, 109

[56]  References Cited

U.S. PATENT DOCUMENTS

| | | | |
|---|---|---|---|
| 3,902,036 | 8/1975 | Zaleckas | 219/121.76 |
| 4,843,209 | 6/1989 | Milligan | 219/121.73 |
| 4,945,489 | 7/1990 | Vahab | 219/121.78 |

FOREIGN PATENT DOCUMENTS

| | | |
|---|---|---|
| 63-197976 | 8/1988 | Japan. |
| 1-170959 | 7/1989 | Japan. |
| 4-17993 | 1/1992 | Japan. |

*Primary Examiner*—Geoffrey S. Evans

[57]  ABSTRACT

A YAG laser machine for processes such as drilling, cutting, and welding includes a YAG laser generator and a guide beam generator for generating a visible guide beam such as a He—Ne laser. During periodic adjustment of beam path by adjustment of the optical elements a cover member is removed. Detachable element(s) are used for preventing reflected beam portion of the laser beam from leaking outside the machine and a safety system is interlocked with a detaching movement of the detachable element(s) for holding the YAG laser generator in a stopped state. Additionally a safety system is present that interlocks the mounting movement of detachable guide beam visual inspection system to hold the Yag laser generator in a stopped state. The guide beam visual inspection system includes a fiber scope with a polarizing plate.

2 Claims, 6 Drawing Sheets

YAG LASER MACHINE WITH SAFETY SYSTEM FOR BEAM PATH ADJUSTMENT

FIELD OF THE INVENTION

This invention relates to a YAG laser processing machine for emitting laser beam onto workpiece thereby to carry out processing thereon such as drilling, cutting, welding and the like.

BACKGROUND OF THE INVENTION

In general, YAG laser processing machines as a machine tool is known for concentrating laser beam through lens means and emitting said beam on works thereby to carry out thereon processing such as drilling, cutting, welding and the like by utilizing high thermal energy density of said beam.

Figure 1:
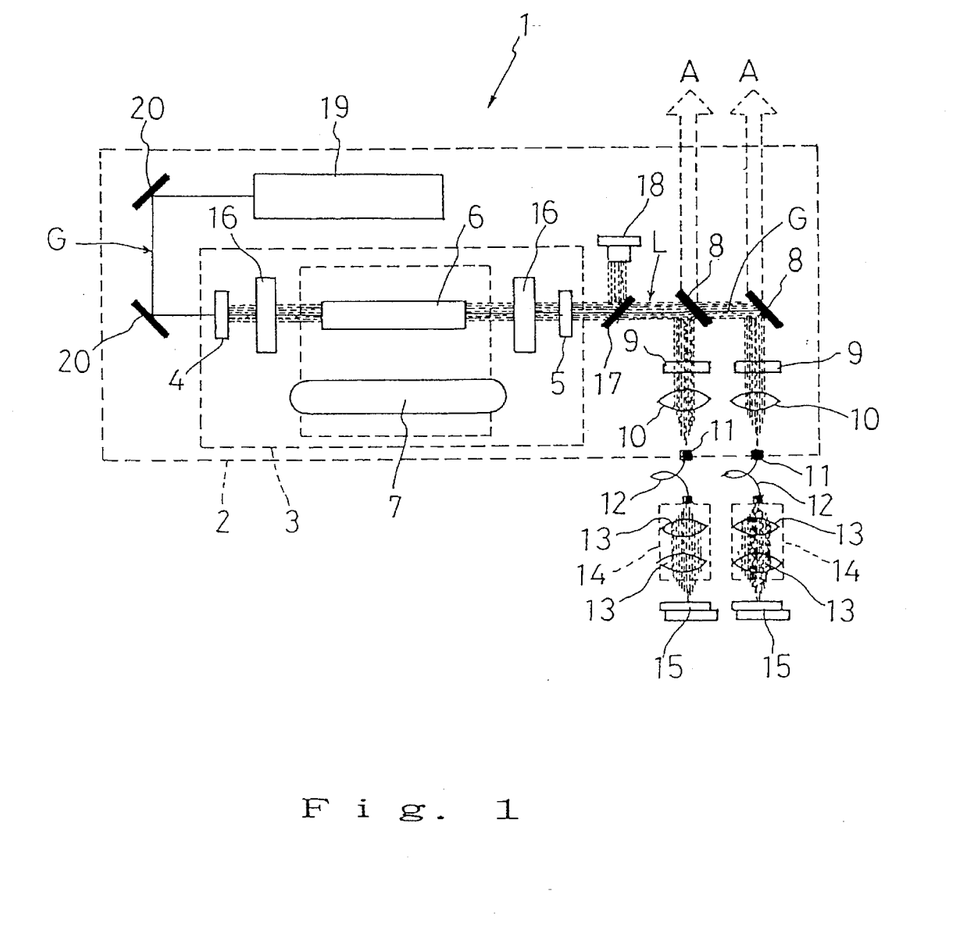
FIG. 1 is a schematic illusutration showing the essemtial portion of conventional YAG laser processing machines.

An example of conventional YAG laser processing machines is described hereinbelow referring to FIG. 1 showing the construction of essential portion of said processing machines.

As shown in FIG. 1, said conventional YAG laser processing machine has a YAG laser generator 3 mounted on a desired oscillator base 2. Said laser generator 3 has therein a YAG rod 6 mounted between a reflecting mirror 4 and an output mirror 5, and light from an excitation lamp 7 driven through a not shown electric power source excites atoms contained in said YAG rod 6, thereby to emit laser beam L through said output mirror 5. Said laser beam L emitted through said output mirror 5 passes successively through desired type of branching mirror 8 located at the right side of said output mirror 5, branching shutter 9 and concentrating lens 10 onto a laser output port 11 consisting of optical fiber connector and the like thereby to form a plurality of output branches. Laser beam L is transmitted from said laser output port 11, through an optical fiber 12, to a suitable laser output unit 14 having two lenses 13 located at suitable positions, then to be emitted onto desired workpiece 15. Main shutters 16 for safety use are located respectively between said YAG rod 6 and said reflecting mirror 4 as well as said output mirror 5. A monitor mirror 17 is located between said output mirror 5 and said branching mirrors 8, said monitor mirror 17 reflecting a portion of laser beam onto a power monitor 18 for checking the output state of laser beam emitted through said output mirror 5.

A suitable guide beam generator 19 is fixed at a suitable position on said oscillator base 2. Said guide beam generator 19 is used for adjusting of optical axis and can emit a visible guide beam G such as He—Ne laser. After being guided by two guide beam mirrors 20,20, said guide beam G is injected from the rear side surface of said reflecting mirror 4 to be transmitted to said laser output port 11.

YAG laser processing machines 1 having the above described construction are subjected to prior-operation or periodical checking for optical axis adjustment such as for example beam axis (beam path) of YAG laser generator 3 itself and the output beam axis (beam path) of laser beam L emitted from said YAG laser generator 3.

When carrying out said adjustment, a not shown cover member covering the elements mounted on said oscillator base 2 is first removed, and said main shutters 16 are opened with said YAG laser generator 3 and said guide beam generator 19 being in respective operable states. Further, at adjusting of optical axis of output beam, said guide beam G is viewed by a not shown guide beam visual inspection means such as fiber scope.

However, said YAG laser generator 3 and said guide beam generator 19 are kept in operable state during said adjustment in the conventional YAG laser processing machines 1 as described above; therefore in this structure of conventional laser processing machines, there occurs a safety problem that said YAG laser generator 3 is accidentally driven owing to an operational error of operator when carrying out said adjustment of optical axis of said output beam which does not need the operable state of said YAG laser generator 3, and said laser beam L is reflected at said concentrating lens 10 and at the end surfaces of said optical fiber 12, resulting in leakage of said laser beam L outwards from rear surface of said branching mirror 8 as shown by dashed arrow A in FIG. 1.

Further, at the adjustment of optical axis of output beam, it is necessary to visually check said guide beam G by means of a guide beam visual inspection means not shown. This adjustment operation gives rise to a large load on the eyes of operator which are most sensible to light, especially when carrying out said adjustment for a long period of time.

SUMMARY OF THE INVENTION

For eliminating the above disadvantages when using conventional YAG laser processing machines, this invention has on object, as its primary object, to provide an improved YAG laser processing machines having a higher safety with decreased load on the eyes of operator when carrying out the adjustment of optical axis.

For the purpose of attaining the object of the invention, YAG laser processing machine is characterized by a YAG laser generator; a guide beam generator for generating a visible guide beam used for optical axis adjustment of said YAG laser generator; detachable means for preventing reflected beam portion of laser beam from leakage outsides; a safety means interlocked with the detaching movement of said detachable means for holding said YAG laser generator in its stopped state.

YAG laser processing machine alternatively is characterized by a YAG laser generator; a guide beam generator for generating a visible guide beam used for optical axis adjustment of said YAG laser generator; detachable guide beam visual inspection means mounted at optical axis adjustment operation for visual inspection of said guide beam; a safety means interlocked with the mounting movement of said guide beam visual inspection means for holding said YAG laser generator in its stopped state.

YAG laser processing machine alternatively is characterized by a YAG laser generator; a guide beam generator for generating a visible guide beam used for optical axis adjustment of said YAG laser generator; detachable means for preventing reflected beam portion of laser beam from leakage outsides; a safety means interlocked with the detaching movement of said detachable means for holding said YAG laser generator in its stopped state; detachable guide beam visual inspection means mounted at optical axis adjustment operation for visual inspection of said guide beam; a safety means interlocked with the mounting movement of said guide beam visual inspection means for holding said YAG laser generator in its stopped state.

In said YAG laser processing machine, detachable means can prevent said reflected beam portion of laser beam emitted at the optical axis adjustment operation, while at the same time the detaching movement of said detachable means actuated said interlocked safety means thereby to hold said YAG laser processing machine in its stopped state.

In said YAG laser processing machine, guide beam visual inspection means permits carrying out the optical axis adjustment of output beam while visually inspecting said guide beam, while at the same time the attaching movement of said guide beam visual inspection means actuates said interlocked safety means thereby to hold said YAG laser processing machine in its stopped state.

In said YAG laser processing machine, detachable means can prevent reflected beam portion of laser beam emitted at the optical axis adjustment operation, and the detaching movement of said detachable means actuates said interlocked safety means thereby to hold said YAG laser processing machine in its stopped state, while at the same time said guide beam visual inspection means permits to carry out the optical axis adjustment of output beam while visually inspecting said guide beam, and the attaching movement of said guide beam visual inspection means drives said interlocked safety means thereby to hold said YAG laser processing machine in its stopped state.

In the YAG laser processing machine, said guide beam visual inspection means comprising a fiber scope equipped with a polarizing plate permits to decrease the load on the eyes of operator at the optical axis adjustment of output beam axis.

YAG laser processing machine according to the invention described above has the advantages that the safety at optical axis adjustment operation can be positively improved, while at the same time the load on the eyes of operator can be considerably decreased due to said polarizing plate attached to said guide beam visual inspection means.

DETAILED DESCRIPTION OF THE EMBODIMENTS

An embodiment of YAG laser processing machines according to the invention is described below with reference to FIGS. 2–9, wherein the same parts thereof as those of conventional machines have the same numbers.

Figure 2:
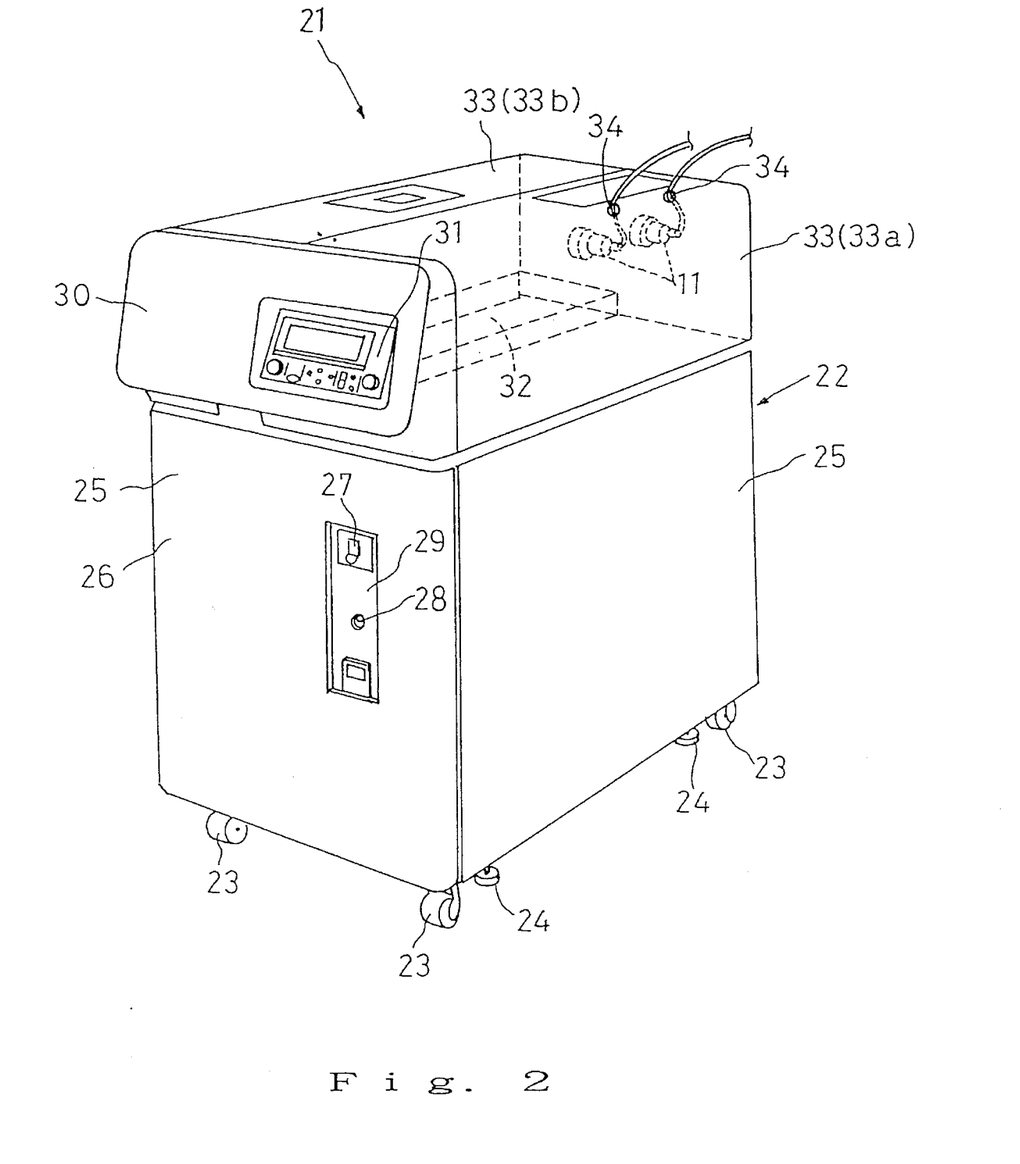
FIG. 2 is a front perspective view of an embodiment of YAG laser processing machines according to the invention.
Figure 3:
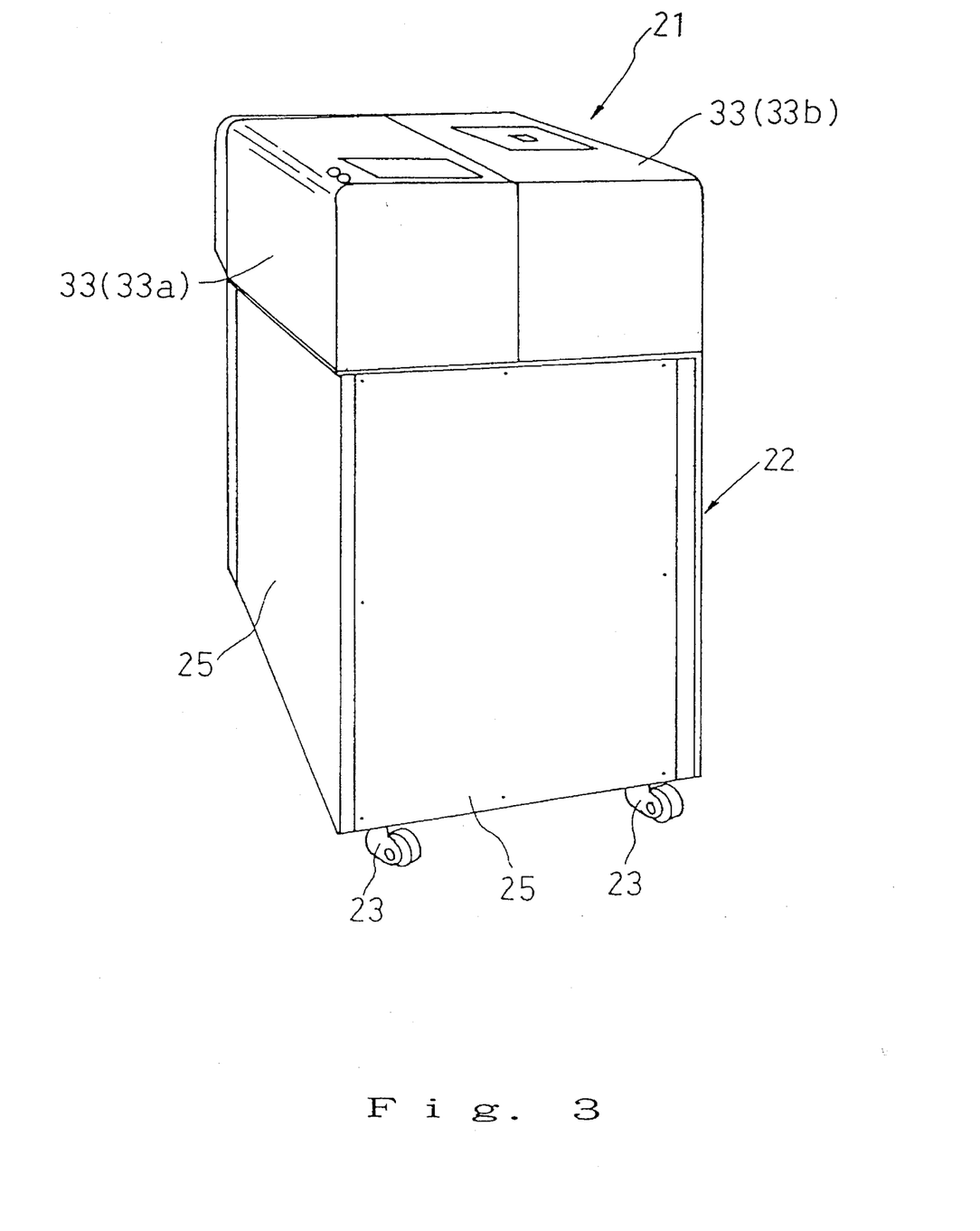
FIG. 3 is a rear perspective view of an embodiment of YAG laser processing machines according to the invention.

As shown in FIG. 2 and FIG. 3, YAG laser processing machine 21 in the embodiment has a mounting cabinet 22 of rectangular cross section. Four lower corners of said mounting cabinet 22 have thereon desired casters 23 and adjusting screws 24, so that said YAG laser processing machine 21 is mobile and adjustable in its level. At least the lateral side surfaces of said mounting cabinet 22 are covered by covering members 25.

As shown in FIG. 2, the front surface 26 of said mounting cabinet 22 has thereon main control panel 29 having suitable main switch 27 and key switch 28 which connect and disconnect not shown control board and electric power source. An upper front panel 30 extending upwardly from said front surface 26 has thereon a control board 31 for operating a not shown controller through operational instructions. An upper covering member 33 is detachably mounted on the rear side of said upper front panel 30 so as to cover a desired oscillator base 32 supported by said mounting cabinet 22, said covering member 33 consisting of right portion 33a and left portion 33b. Said upper covering member 33 prevents laser beam L from leaking from a running YAG laser processing machine. The upper portion of said right portion 33a has therein through holes 34 for inserting respective optical fibers 12.

Figure 4:
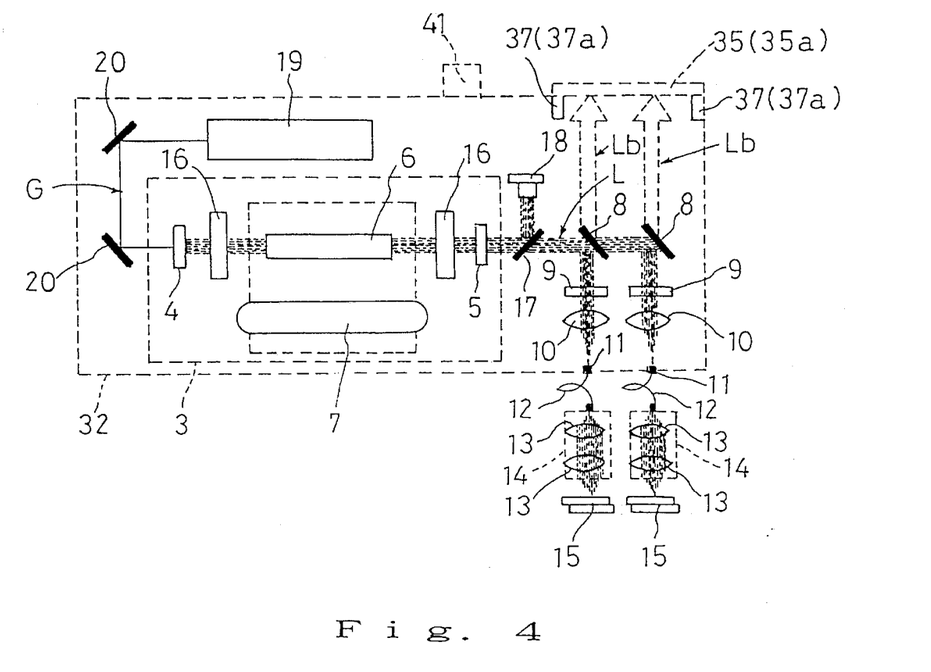
FIG. 4 is a schematic illusutration showing the essential portion mounted on oscillator base of YAG laser processing machines according to the invention.

As shown in FIG. 4, said YAG laser processing machine has a YAG laser generator 3 mounted on the substantially central portion of the upper surface of a desired oscillator base 32. Said laser generator 3 has therein a YAG rod 6 mounted between a reflecting mirror 4 and an output mirror 5, said mirrors 4,5 being located position-controllably and in parallel relation with each other, and beam from an excitation lamp 7 driven through a not shown electric power source located at a desired position excites atoms contained in said YAG rod 6, thereby to emit laser beam L through said output mirror 5. Said laser beam L emitted through said output mirror 5 is transmitted successively through a position-controllable branching mirror 8 located on the right side of said output mirror 5, a closable branching shutter 9 and a position-controllable concentrating lens 10 thereby to be focused so as to have a diameter of approximately 0.2–1.0 mm, and onto a position-controllable laser output port 11 consisting of optical fiber connector and the like thereby to form a plurality of output branches.

Laser beam L is transmitted from said laser output port 11, through a optical fiber 12, to a suitable output unit 14 having two lenses 13 and being located outside at suitable position, then to be emitted onto desired workpiece 15 for carrying out processings such as drilling, cutting and welding.

Main shutters 16 for safety use are located respectively between said YAG rod 6 and said reflecting mirror 4 as well as said output mirror 5.

A monitor mirror 17 is located between said output mirror 5 and said branching mirrors 8, said monitor mirror 17 reflecting a portion of laser beam onto a power monitor 18 for checking the output state of laser beam emitted through said output mirror 5.

A suitable guide beam generator 19 is shown above said YAG laser generator 3 on said oscillator base 32 in FIG. 4. Said guide beam generator 19 is used for adjusting of optical axises such as beam axis (beam path) of said YAG laser generator 3 itself and output beam axis (beam path) of laser beam L emitted from said YAG laser generator 3, and can emit a visible guide beam G such as He—Ne laser. After transmitted by means of two guide beam mirror 20, said guide beam G is injected from the rear side surface of said reflecting mirror 4 to be transmitted onto said laser output port 11.

As shown in FIG. 4, either a detachable means for preventing reflected beam portion of laser beam from leakage outsides 35 or a guide beam visual inspection means 36

(FIG. 7), when necessary, is located at external side of said oscillator base 32 and on the extension of respective lines connecting said branching mirrors 8, said branching shutters 9 and said concentrating lenses 10.

Figure 5:
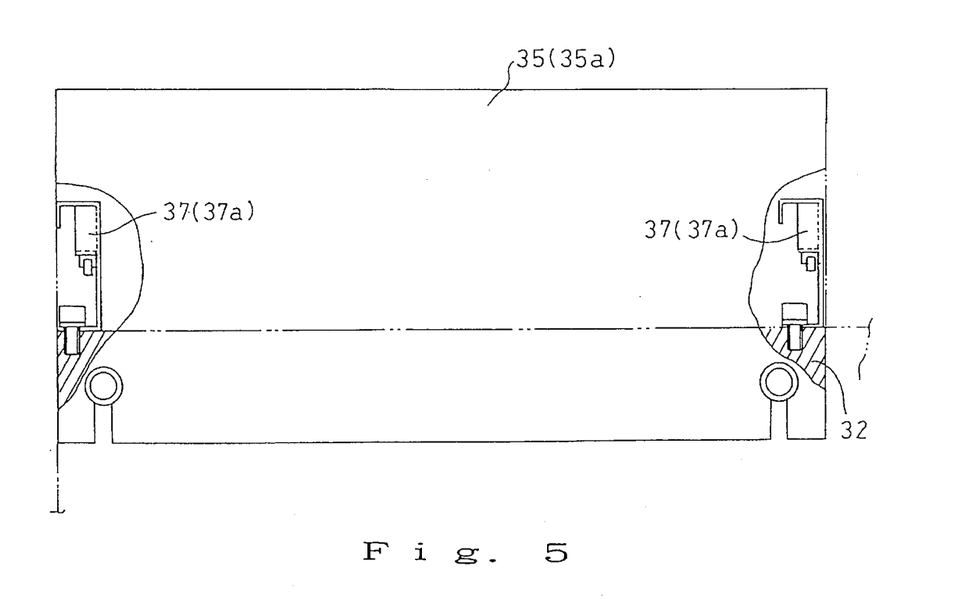
FIG. 5 is a partially broken away front perspective view of means for preventing reflected beam portion of laser beam from leakage.
Figure 6:
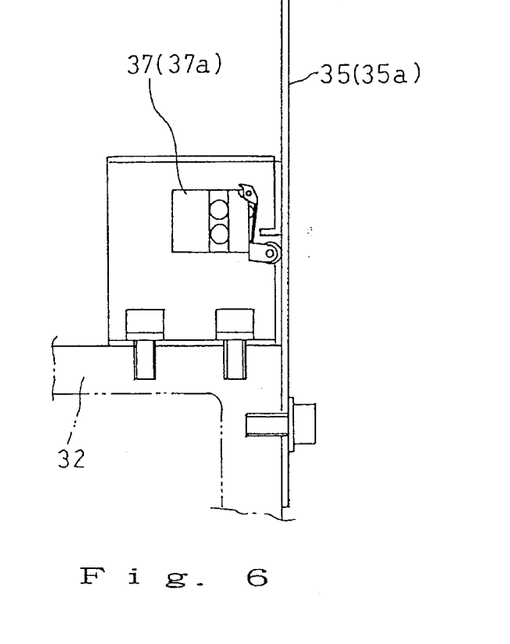
FIG. 6 is a side view of the means for leakage preventing reflected beam portion of laser beam from shown in FIG. 5.

As shown in FIG. 5 and FIG. 6, said reflected beam portion leakage preventing means 35 comprises a barrier plate 35a, which is mounted in the case of optical axis adjusting operation and used for preventing reflected beam portion Lb shown by dashed arrows in FIG. 4, said reflected beam portion Lb being generated when laser beam is reflected at said beam concentrating lenses 10 and at the end surface of said optical fibers 12 in said optical axis adjusting operation.

Limit switches 37a as safety means 37 which are actuated through attaching and detaching operation of said barrier plate 35a are located adjacent thereto on the upper surface of said oscillator base 32 (as shown in FIGS. 4, 5, 6). In this embodiment, when said limit switches 37a are actuated by the inner surface of said left covering member 33b, said switches render operable said YAG laser generator 3. When said left upper cover 33b is removed for optical axis adjustment, said switches 37a are released from said actuating state thereby to hold said YAG laser generator 3 in a stopped state. Thus in this embodiment, the attaching operation of said barrier plate 35a forces said switches 37a to come into actuating state with said barrier plate 35a thereby to render operable said YAG laser generator 3, while the detaching operation of said barrier plate 35a forces said switches 37a to get out of said actuating state thereby to hold said YAG laser generator 3 in a stopped state.

Further, the invention is not limited to the above construction. For example, said barrier plate 35a may be normally located on said oscillator base 32 so as to hold the actuating state with said limit switches 37a, while a detaching operation of said barrier plate 35a forcing said switches 37a to get out of said actuating state thereby to hold said YAG laser generator 3 in a stopped state. Said safety means 37 can be any means which is operated by the attaching and detaching operations of barrier plate 35a. For example, it can be selected from contacting type of switches such as microswitches or non-contacting type of switches such as proximity switch, optical switch and the like depending upon the given design concept.

Figure 7:
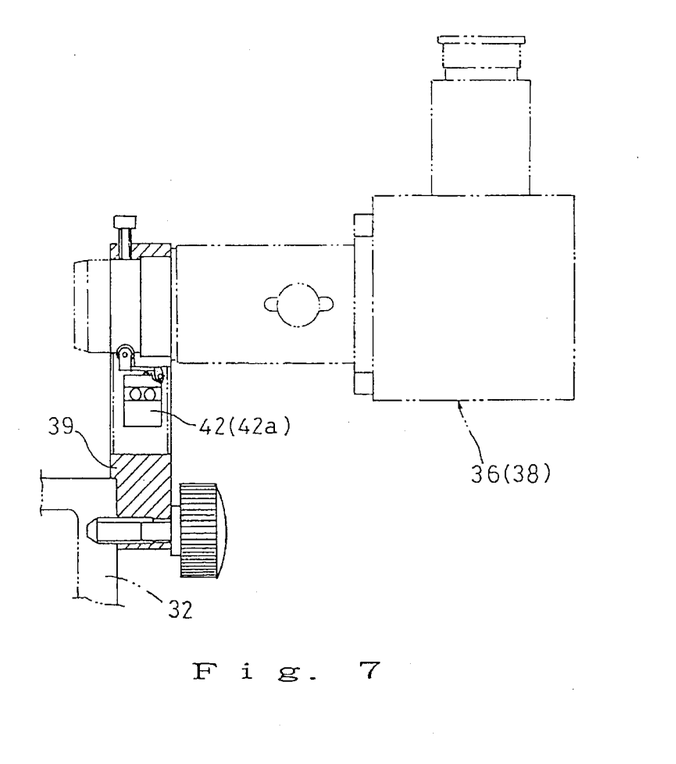
FIG. 7 is a front view of a guide beam visual inspection means.
Figure 8:
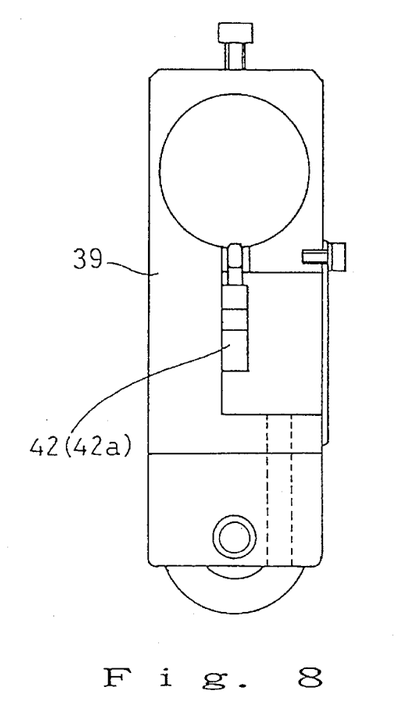
FIG. 8 is a side view of the visual inspection means shown in FIG. 7.
Figure 9:
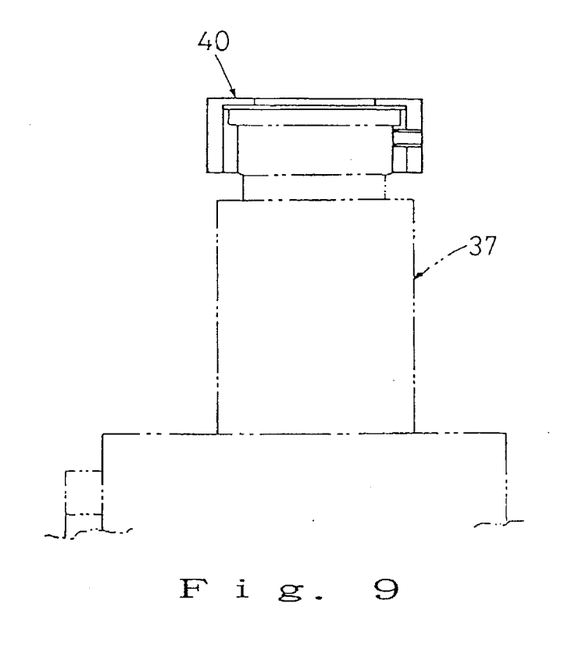
FIG. 9 is a polarizing plate used in YAG laser processing machines according to the invention.

As shown in FIG. 7 and FIG. 8, said guide beam visual inspection means 36 is a means for visually inspecting said guide beam G at the optical axis adjustment (more precisely, at output beam axis adjustment) which comprises a desired fiber scope 38 in this embodiment. Said fiber scope 38 is detachably attached to a scope holder 39, and said scope holder 39 is attached at the predetermined position of said oscillator base 32 at said optical axis adjustment operations for using said fiber scope 38. A desired polarizing plate 40 is located on the ocular side of said fiber scope 38 for adjusting the strength of said guide beam G as shown in FIG. 9.

Said scope holder 39 is normally fixed at a suitable position 41 (FIG. 4) on said oscillator base 32 with said fiber scope 38 detached therefrom, and is fixed at a predetermined position on said oscillator base 32 at the optical axis adjustment.

As shown in FIGS. 7 and 8, a limit switch 42a as safety device 42 operated by attaching and detaching operations of said fiber scope 38 is located in the proximity of the attaching position of fiber scope 38 on said scope holder 39. Said limit switch 42a renders operable said YAG laser generator 3 in the normal state when said fiber scope 38 is not attached to said scope holder 39, while on the other hand holding said YAG laser generator 3 in a stopped state in response to said mounting operation of said fiber scope 38 on said scope holder 39 in said beam adjustment operation.

The operation of the constitution described above according to this embodiment is now described herein below.

Said optical axis adjustment in said YAG laser processing machine 21 is carried out in the state thereof wherein said left upper cover 33b is removed and said YAG laser generator 3 and said guide beam generator 19 are in standby state, with said main shutters 16 being kept open. When said left upper cover 33b is removed, said limit switch 37a, actuating as safety means 37 through the detaching movement of said barrier plate 35a, kept in said actuating state by said inner surface of said left upper cover 33b gets in a non-actuating state thereby to hold positively said YAG laser generator 3 in a stopped state, ensuring safety.

In said optical axis adjustment operation, after getting the coincidence of axis between said guide beam G and said laser beam L, said beam axis adjustment of YAG laser generator 3 itself is carried out by means of laser beam L, while said output beam axis adjustment being carried out by using said guide beam G.

At the beam axis adjustment using said laser beam L, said barrier plate 35a is attached to the predetermined position of said oscillator 32 as shown in FIGS. 5 and 6, and thus blocks positively said reflected beam portion beams Lb reflected by said concentrating lenses 10 and said optical fibers 12, thus preventing said reflected beam portion beams from leakage through said branching mirrors 8. At the same time, said limit switches 37a comes into actuating state with said barrier plate 35a by the attaching operation thereof thereby to render operable said YAG laser generator 3, thus assuring the safety in optical axis adjustment.

At the output beam axis adjustment operation using said guide beam G, said barrier plate 35a is removed from said oscillator base 32, and said scope holder 39 is fixed on the predetermined position on said oscillator 32. After said fiber scope 38 being attached on said scope holder 39, said output beam axis adjustment can be carried out by means of visually inspecting said guide beam G through said fiber scope 38.

In the latter output beam axis adjustment, since said barrier plate 35a is removed from said oscillator plate 32, said limit switches 37a gets in a non-actuating state with said barrier plate 35a, thereby to hold said YAG laser generator 3 in its stopped state. At the same time, said fiber scope 38 is attached to said scope holder 39, so that said limit switch 42a as safety device 42 is operated by said attaching of said scope holder 39 thereby to hold said YAG laser generator 3 in its stopped state, ensuring safety.

In other words, at said output beam axis adjustment operation using said guide beam G which need not the operating state of said YAG laser generator 3, said safety device 37 which is rendered operable by detaching of said barrier plate 35a and safety device 42 which becomes operable by attaching of said fiber scope 38 can assure in a double manner the stopped state of said YAG laser generator 3 for an improved safety at said optical axis adjustment.

The construction where said barrier plate 35 is detachable has been described above, but with respect to the construction where said plate 35 is not detachable, said fiber scope 38 can be placed in the beam path of said reflected beam portion Lb, and in this case the safety can be sufficiently assured by using only said safety device 42 operating by the attaching of said fiber scope 38 thereby to suitably control the driving of said YAG laser generator 3.

Further, fitting of said polarizing plate 40 on said fiber scope 38 can decrease the strength of said guide beam G, thereby to positively decrease the load on eyes of operator at the visual inspection of said guide beam G, especially at long time visual inspection.

While the present invention has been described with reference to exemplary embodiments thereof, it will be appreciated by those skilled in the art that variations and modifications may be made thereto if necessary without departing from the spirit of the inventive concepts disclosed herein.

What is claimed is:

1. YAG laser processing machine characterized by a YAG laser generator; a guide beam generator for generating a visible guide beam used for optical axis adjustment of said YAG laser generator; detachable means for preventing the reflected beam portion of the laser beam from leakage outside the machine; a safety means interlocked with detaching movement of said detachable means for holding said YAG laser generator in its stopped state; detachable guide beam visual inspection means, comprising a fiber scope, mounted for optical axis adjustment operation for visual inspection of said guide beam; a safety means interlocked with the mounting movement of said detachable guide beam visual inspection means for holding said YAG laser generator in its stopped state when the inspection means is operably attached to the machine.

2. YAG laser processing machine claimed in said claim 1 which is characterized in that said fiber scope includes a polarizing plate.

* * * * *